(12) United States Patent
Shin et al.

(10) Patent No.: US 8,492,016 B2
(45) Date of Patent: Jul. 23, 2013

(54) MIDDLE AND LARGE-SIZED BATTERY PACK HAVING IMPROVED COOLING EFFICIENCY

(75) Inventors: Yongshik Shin, Daejeon (KR); Heekook Yang, Daejeon (KR); Jin Woong Ha, Daejeon (KR); Jongmoon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 483 days.

(21) Appl. No.: 12/666,723

(22) PCT Filed: Jun. 25, 2008

(86) PCT No.: PCT/KR2008/003653
§ 371 (c)(1),
(2), (4) Date: Oct. 5, 2010

(87) PCT Pub. No.: WO2009/002096
PCT Pub. Date: Dec. 31, 2008

(65) Prior Publication Data
US 2011/0020677 A1 Jan. 27, 2011

(30) Foreign Application Priority Data
Jun. 28, 2007 (KR) .................. 10-2007-0064289

(51) Int. Cl.
*H01M 2/12* (2006.01)
*H01M 10/50* (2006.01)
*H01M 6/42* (2006.01)
*H01M 6/46* (2006.01)
*H01M 2/08* (2006.01)

(52) U.S. Cl.
USPC ............. 429/71; 429/120; 429/151; 429/152; 429/153; 429/186

(58) Field of Classification Search
USPC ................... 429/71, 120, 151, 152, 153, 186
See application file for complete search history.

(56) References Cited

U.S. PATENT DOCUMENTS

| | | | |
|---|---|---|---|
| 5,212,024 A | 5/1993 | Klink et al. | |
| 5,456,994 A | 10/1995 | Mita | |
| 2002/0028375 A1 | 3/2002 | Morishita et al. | |
| 2003/0180590 A1 | 9/2003 | Hase et al. | |

(Continued)

FOREIGN PATENT DOCUMENTS

| | | |
|---|---|---|
| DE | 4116253 C1 | 6/1992 |
| GB | 2027978 A | 2/1980 |

(Continued)

*Primary Examiner* — Helen O Conley
(74) *Attorney, Agent, or Firm* — Birch, Stewart, Kolasch & Birch, LLP

(57) ABSTRACT

Disclosed herein is a middle- or large-sized battery pack including a module assembly constructed in a structure in which a plurality of battery modules, each of which includes a plurality of battery cells or unit modules mounted in a module case while the battery cells or unit modules are connected in series to each other, are arranged such that the battery modules are disposed in contact with each other in the lateral direction, and a coolant flow channel is vertically formed, a plurality of support members for supporting opposite sides and the bottom of the module assembly and maintaining the arrangement state of the module assembly, and a pack housing for surrounding the module assembly and the support members, wherein the battery pack is constructed in a cooling structure in which a coolant is introduced through one side upper end (or lower end) of the module assembly along a hermetically sealed space defined by the support members, flows vertically through the module assembly, and is discharged through the other side lower end (or upper end) of the battery assembly.

14 Claims, 4 Drawing Sheets

U.S. PATENT DOCUMENTS

| | | |
|---|---|---|
| 2005/0130033 A1 | 6/2005 | Iwamura et al. |
| 2006/0090492 A1 | 5/2006 | Ahn et al. |
| 2006/0216581 A1 | 9/2006 | Hwang et al. |
| 2007/0072066 A1 | 3/2007 | Yoon et al. |

FOREIGN PATENT DOCUMENTS

| | | |
|---|---|---|
| JP | 2000-243461 A | 9/2000 |
| JP | 2001-229901 A | 8/2001 |
| JP | 3355958 B2 | 12/2002 |
| JP | 2004-22338 A | 1/2004 |
| JP | 2004-362958 A | 12/2004 |
| JP | 2005-11787 A | 1/2005 |
| JP | 2005-302590 A | 10/2005 |
| JP | 2006-339031 A | 12/2006 |
| KR | 10-2007-0043515 A | 4/2007 |
| KR | 10-2007-0112490 A | 11/2007 |
| WO | WO-2006/080679 A1 | 8/2006 |

MIDDLE AND LARGE-SIZED BATTERY PACK HAVING IMPROVED COOLING EFFICIENCY

FIELD OF THE INVENTION

The present invention relates to a middle- or large-sized battery pack of high cooling efficiency, and, more particularly, to a middle- or large-sized battery pack including a module assembly constructed in a structure in which a plurality of battery modules, each of which includes a plurality of battery cells or unit modules mounted in a module case while the battery cells or unit modules are connected in series to each other, are arranged such that the battery modules are disposed in contact with each other in the lateral direction, and a coolant flow channel is vertically formed, a plurality of support members for supporting opposite sides and the bottom of the module assembly and maintaining the arrangement state of the module assembly, and a pack housing for surrounding the module assembly and the support members, wherein the battery pack is constructed in a cooling structure in which a coolant is introduced through one side upper end (or lower end) of the module assembly along a hermetically sealed space defined by the support members, flows vertically through the module assembly, and is discharged through the other side lower end (or upper end) of the battery assembly.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected to each other because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide power and capacity required by a predetermined apparatus or device, it is necessary for the middle- or large-sized battery module to be constructed in a structure in which a plurality of battery cells are electrically connected in series to each other, and the battery cells are stable against an external force.

Also, the battery cells constituting the middle- or large-sized battery module are secondary batteries which can be charged and discharged. Consequently, a large amount of heat is generated from the high-power, large-capacity secondary battery during the charge and discharge of the battery cells. If the heat, generated from the unit cells during the charge and discharge of the unit cells, is not effectively removed, the heat accumulates in the respective unit cells, with the result that the deterioration of the unit cells is accelerated. According to circumstances, the unit cells may catch fire or explode. For this reason, a battery pack for vehicles, which is a high-power, large-capacity battery, needs a cooling system for cooling battery cells of the battery pack.

In relation to this matter, some conventional arts disclose middle- or large-sized battery modules constructed in structures to improve cooling efficiency. For example, Japanese Registered Patent No. 3355958 discloses a middle- or large-sized battery module including a plurality of battery cells stacked in a limited space, such as a vehicle, constructed in a structure in which protrusions defining a coolant flow channel are formed at the outside of each battery cell, such that a coolant cools the battery cells while the coolant passes through each stacked battery group after the coolant is introduced between the battery groups, in order to prevent the cooling efficiency of the coolant from lowering when the coolant passes through one stacked battery group in a state in which the temperature of the coolant increases after the coolant passes through another stacked battery group. Also, the battery cells used in this patent are alkaline batteries such as nickel-metal hydride batteries. For this reason, it is required to form the external shape of the battery module such that the battery module itself exhibits high mechanical strength. Consequently, plates are disposed at opposite sides of the stack of the battery cells, and the plates are fixed by bands, to construct the middle- or large-sized battery module.

As a result, the disclosed middle- or large-sized battery module has a problem in that the volume and weight of the battery module greatly increase due to its external shape to provide high mechanical strength although the cooling efficiency of the battery module is partially improved.

In a middle- or large-sized battery pack including a plurality of battery cells, on the other hand, the deterioration in performance of some battery cells leads to the deterioration in performance of the entire battery pack. One of the main factors causing the nonuniformity of the performance is the nonuniformity of cooling between the battery cells. For this reason, it is required to provide a structure to secure the uniformity of cooling during the flow of a coolant.

The cooling efficiency greatly changes according to the structure of a coolant flow channel in the battery pack. Consequently, there is a high necessity for a middle- or large-sized battery pack that is capable of preventing the leakage of a coolant to the outside, while the middle- or large-sized battery pack is constructed in a more compact and stable structure, thereby improving the cooling efficiency.

SUMMARY OF THE INVENTION

Therefore, the present invention has been made to solve the above problems, and other technical problems that have yet to be resolved.

Specifically, it is an object of the present invention to provide a middle- or large-sized battery pack that can be simply assembled, has a compact and stable structure, is capable of uniformalizing the flow rate of a coolant flowing in a coolant flow channel defined between battery cells, and is capable of effectively removing heat generated during the charge and discharge of the battery cells by the uniform flow of the coolant, thereby improving the cooling efficiency.

In accordance with one aspect of the present invention, the above and other objects can be accomplished by the provision of a middle- or large-sized battery pack including a module assembly constructed in a structure in which a plurality of battery modules, each of which includes a plurality of battery cells or unit modules mounted in a module case while the battery cells or unit modules are connected in series to each other, are arranged such that the battery modules are disposed in contact with each other in the lateral direction, and a coolant flow channel is vertically formed, a plurality of support members for supporting opposite sides and the bottom of the module assembly and maintaining the arrangement state of the module assembly, and a pack housing for surrounding the module assembly and the support members, wherein the battery pack is constructed in a cooling structure in which a coolant is introduced through one side upper end (or lower end) of the module assembly along a hermetically sealed space defined by the support members, flows vertically through the module assembly, and is discharged through the other side lower end (or upper end) of the battery assembly.

Each of the battery modules of the middle- or large-sized battery pack according to the present invention is generally manufactured by stacking a plurality of battery cells with high density. At this time, the battery cells are stacked while the battery cells are spaced a predetermined distance from each other to remove heat generated during the charge and discharge of the battery cells. For example, the battery cells themselves are successively stacked, while the battery cells are spaced a predetermined distance from each other, without using additional members. When the battery cells have low mechanical strength, on the other hand, one or more battery cells are mounted in a cartridge, and a plurality of such cartridges are stacked to construct a battery module. A coolant flow channel is defined between the stacked battery cells or the battery modules to effective remove heat accumulating between the battery cells or the battery modules.

The middle- or large-sized battery pack according to the present invention is constructed in a structure in which the arrangement state of a module assembly including the plurality of battery modules arranged in the lateral direction while the battery modules are disposed in contact with each other is maintained by the support members, and the module assembly, to which the support members are coupled, is surrounded by the pack housing.

In the cooling structure of the middle- or large-sized battery pack, the coolant is introduced through one side upper end (or lower end) of the module assembly along the hermetically sealed space defined by the support members, flows along the vertical coolant flow channel formed in the module assembly, and is discharged through the other side lower end (or upper end) of the battery assembly. Consequently, the cooling efficiency due to the flow of the coolant is increased, and the uniform cooling effect is achieved. Furthermore, the coolant flow channel is defined by the support members. Consequently, the support members serve to define the coolant flow channel as well as maintain the arrangement state of the module assembly. Also, the number of the support members is small, and therefore, it is possible to manufacture the middle- or large-sized battery pack in a compact structure.

The positions of the coolant inlet port and the coolant outlet port may be changed depending upon the structure of a device using the middle- or large-sized battery pack. For example, it is possible that the coolant is introduced through the rear upper end of the module assembly, flows downward vertically through the module assembly, and is discharged through the front lower end of the battery assembly.

In a preferred embodiment, the support members include a pair of side support members for preventing the coolant from leaking to the outside while surrounding sides of the outermost battery modules of the module assembly, a pair of bottom support members for supporting front and rear lower ends of the module assembly while spacing the module assembly from the bottom by a predetermined height, the bottom support members being coupled to the side support members, and at least one top connection member connected to the side support members for guiding the coolant to the module assembly from the top of the module assembly.

Specifically, a plurality of battery cells or battery modules are stacked in the longitudinal direction and/or the lateral direction to constitute the module assembly, the opposite sides of the module assembly are surrounded by the side support members, the module assembly is fixed by the bottom support members and the top connection members, connected to the side support members, and the module assembly is surrounded by the pack housing. Consequently, the battery pack according to the present invention is simply assembled and has a compact and stable structure.

Also, the respective support members prevent the coolant from leaking out of the battery pack while the support members uniformly distribute the coolant to the respective battery modules, thereby more improving the cooling efficiency.

In a preferred embodiment, each of the side support members, disposed in tight contact with the sides of the module assembly, is generally constructed in a plate-shaped structure including a plate-shaped body and an insulation member mounted to the inside of the plate-shaped body where the plate-shaped body is disposed in contact with the module assembly for preventing the leakage of the coolant, securing the uniformity in temperature of the module assembly, and preventing the occurrence of a short circuit.

When the side support members are made of a conductive material, for example, the insulation members prevent the occurrence of a short circuit in the module assembly due to the deformation of the side support members caused by an external force. Also, the sealing is achieved between the opposite sides of the module assembly and the side support members, with the result that the coolant is guided to flow only through the module assembly, thereby improving the cooling efficiency.

Preferably, the insulation members are made of a heat resistant material.

The insulation members, made of the heat resistant material, are located between the outermost battery modules of the module assembly and the plate-shaped bodies of the side support members to prevent the outermost battery modules from being more rapidly cooled than the remaining battery modules disposed between the outermost battery modules. When temperature difference occurs between the battery modules constituting the module assembly, the deterioration of some battery modules is accelerated, with the result that the operation performance of all the battery modules may be deteriorated. Consequently, the insulation members restrain the heat dissipation from outermost battery modules and secure the uniformity in temperature, thereby preventing the occurrence of the temperature difference between the battery modules.

In a preferred embodiment, the heat resistant material, of which the insulation members are made, is a polymer material, for example, including a plurality of closed pores. More preferably, the insulation members are made of styrene foam or polyethylene (PE) foam exhibiting high insulation and heat resistance while having a small weight.

According to circumstances, the plate-shaped body of each side support member may be provided with a plurality of beads, by which each side support member exhibits high durability or structural stability against an external force, such as twist, vibration, etc. The beads may be constructed in a concavo-convex structure having a large length to width ratio, and the beads may be arranged parallel to each other.

According to the present invention, each of the bottom support members preferably includes a frame body coupled to the front or rear lower end of the module assembly and side coupling parts formed at opposite ends of the frame body such that the side coupling parts are coupled to the side support members.

For example, the frame bodies of the bottom support members are disposed in tight contact with the front lower end and the rear lower end of the module assembly, and the side coupling parts, formed at the opposite ends of the respective frame bodies, are coupled to the side support members by means of coupling members, such as bolts or rivets, whereby the module assembly is securely fixed.

The bottom support members may be mounted on a base plate constructed in a structure in which a pair of rails continuously protrude upward to define the coolant flow channel while supporting the opposite ends of the bottom support members.

As a concrete example, the base plate is provided at opposite sides thereof with a pair of rails which protrude upward in the direction parallel to the flow direction of the coolant flowing along the bottom of the module assembly, and the pair of rails formed at the base plate are mechanically coupled to the side coupling parts formed at the opposite ends of the bottom support members.

The module assembly is mounted on the bottom support members. Consequently, a gap is provided between the bottom of the module assembly and the rails of the base plate. The gap may be used as an introduction or discharge channel of the coolant.

In another preferred embodiment, it is required to measure and control voltage and temperature of a battery pack or a battery module including a plurality of battery cells in consideration of the safety and operational efficiency of the battery pack or the battery module. In particular, the voltage is required to be measured for each battery cell or for each electrical connection region between the respective battery cells. Consequently, the middle- or large-sized battery pack may further include a control member mounted at the rear of the module assembly for receiving and processing at least one operational information selected from a group consisting of voltage, current, and temperature from the respective battery modules.

In a preferred embodiment, the at least one top connection member connected to the side support members includes two or more top connection members, and, among the top connection members, the top connection member located near the front of the module assembly has a height sufficient to come into tight contact with the pack housing in the longitudinal direction thereof.

That is, among the two or more top connection members connected to the side support members located at the opposite sides of the module assembly, the top connection member located near the front of the module assembly presses the front end of the module assembly and, at the same time, is disposed in tight contact with the inside of the pack housing, with the result that it is possible for the top connection member to prevent the coolant introduced through the rear upper end of the module assembly from being discharged through the front of the module assembly. Consequently, it is possible to guide the coolant such that the coolant flows downward through the respective battery modules, while moving along the top of the module assembly, and is discharged through the coolant outlet port formed at the lower end of the pack housing.

The top connection member with the above-described structure simultaneously serves to fixedly interconnect the side support members, prevent the discharge of the coolant through the front of the module assembly, and guide the flow of the coolant such that the coolant flows vertically downward through the respective battery modules. Furthermore, since one member simultaneously serves to perform two functions, it is possible to reduce the number of parts necessary to manufacture the battery pack and simplify the manufacturing process of the battery pack, and therefore, it is possible to greatly reduce the manufacturing costs of the middle- or large-sized battery pack.

The pack housing may include a housing body coupled to the base plate while the housing body surrounds the top of the module assembly and the side support members, a front plate mounted to the front of the housing body, and a rear plate mounted to the rear of the housing body.

Preferably, the housing body of the pack housing is fixed to the base plate by coupling using bolts and nuts. Preferably, in order to achieve such coupling, the housing body is provided at the side lower ends thereof with plate-shaped extensions, and corresponding plate-shaped extensions are also formed outside the rails of the base plate. Consequently, the housing body is fixed to the base plate by the mechanical coupling between the plate-shaped extensions. Subsequently, the front plate and the rear plate are coupled to the open front and rear of the housing body, whereby the assembly of the pack housing is completed.

According to circumstances, the housing body may be provided at the top and opposite sides thereof with a plurality of beads formed in a concavo-convex shape for improving the durability or the structural stability of the housing body against an external force, such as twist, vibration, etc., and the beads formed at the top of the housing body may be constructed in a depressed structure while the beads formed at the opposite sides of the housing body may be constructed in a protruding structure.

For example, the housing body of the pack housing is provided with a plurality of beads constructed in a concavo-convex structure having a large length to width ratio. Also, these beads may be constructed in a depressed structure in which the beads are depressed inside the pack housing and a protruding structure in which the beads protrude outside the pack housing.

When the battery pack according to the present invention is installed in an external device, the beads formed at the top of the housing body are constructed in the depressed structure such that the battery pack can occupy a more compact-sized receiving space of the external device. On the other hand, although the beads formed at the opposite sides of the housing body are constructed in the protruding structure, the beads do not further occupy the receiving space, since the plate-shaped extensions extends by a predetermined length from the side lower ends of the housing body in the lateral direction of the housing body.

The front plate of the pack housing is provided with one or more through-holes for wiring cable connection, whereby it is possible to connect wires of the battery modules connected in series or parallel to each other to the outside of the pack housing through the through-holes, and the rear plate of the pack housing is provided with one or more coolant inlet ports for coolant introduction, whereby it is possible to introduce the coolant into the pack housing through the coolant inlet ports.

The battery cells may be secondary batteries preferably having small thickness and relatively large width and length such that, when the battery cells are stacked to construct a battery module, the total size is minimized. In a preferred embodiment, each of the battery cells is a pouch-shaped battery cell constructed in a structure in which an electrode assembly is mounted in a battery case made of a laminate sheet including a metal layer and a resin layer, and electrode terminals protrude from the upper and lower ends of the battery case. Specifically, each of the battery cells is constructed in a structure in which an electrode assembly is mounted in a pouch-shaped battery case made of an aluminum laminate sheet. The secondary battery with the above-stated construction may be referred to as a 'pouch-shaped battery cell.'

Each of the unit modules is a small-unit battery module including a plurality of battery cells electrically connected to each other. For example, each of the unit modules includes two or more battery cells constructed in a structure in which electrode terminals are connected in series to each other, and connections between the electrode terminals are bent such that the battery cells are stacked, and a pair of high-strength module cases coupled to each other to surround the battery cells excluding the electrode terminal regions. A detailed example of such unit module may be a module disclosed in Korean Patent Application No. 2006-0045444, which has been filed in the name of the application of the present application and the disclosure of which is incorporated herein by reference.

According to circumstances, the coolant outlet port is formed at the front of the pack housing, and a cooling fan is preferably mounted in the coolant outlet port for guiding the coolant such that the coolant, introduced through the coolant inlet port, flows through the respective battery modules, rapidly and smoothly moves to the coolant outlet port, and is then discharged out of the battery pack.

The middle- or large-sized battery pack according to the present invention may be manufactured by appropriately combining the battery modules according to desired power and capacity. In consideration of the installation efficiency and the structural stability of the battery pack as previously described, the battery pack may be used as, but is not limited to, a power source for electric vehicles, hybrid electric vehicles, electric motorcycles, and electric bicycles, which have a limited installation space and are exposed to frequent vibration and strong impact.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
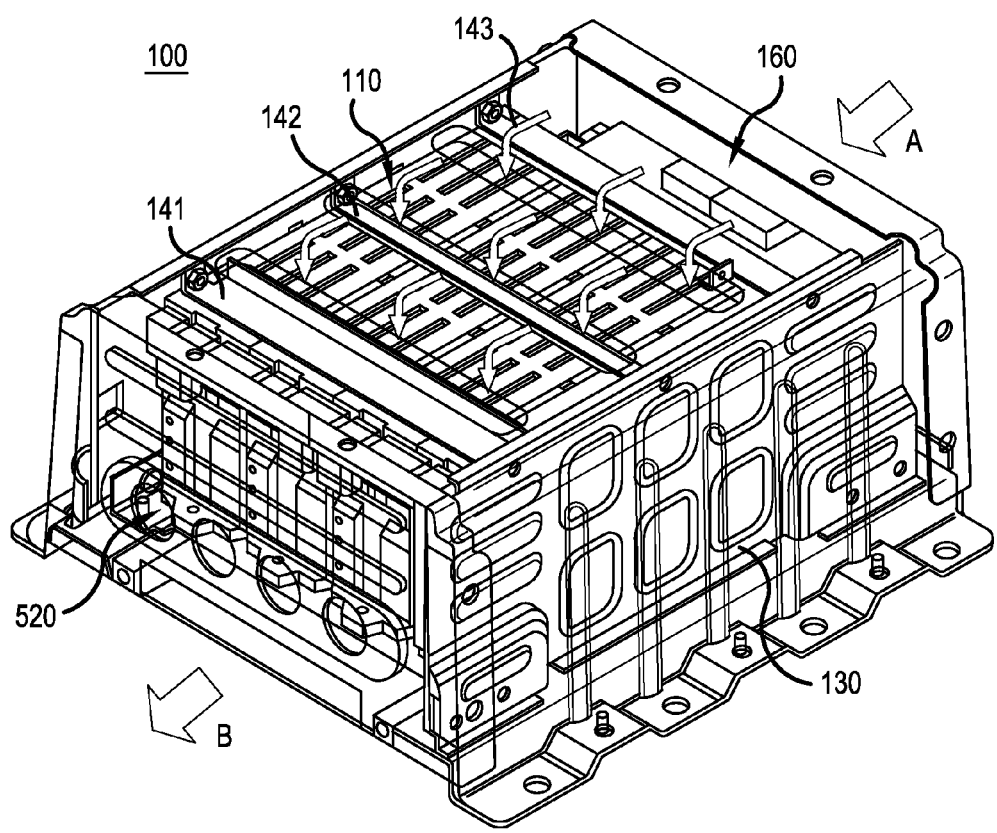
FIG. 1 is a see-through view typically illustrating a middle- or large-sized battery pack according to a preferred embodiment of the present invention.
Figure 2:
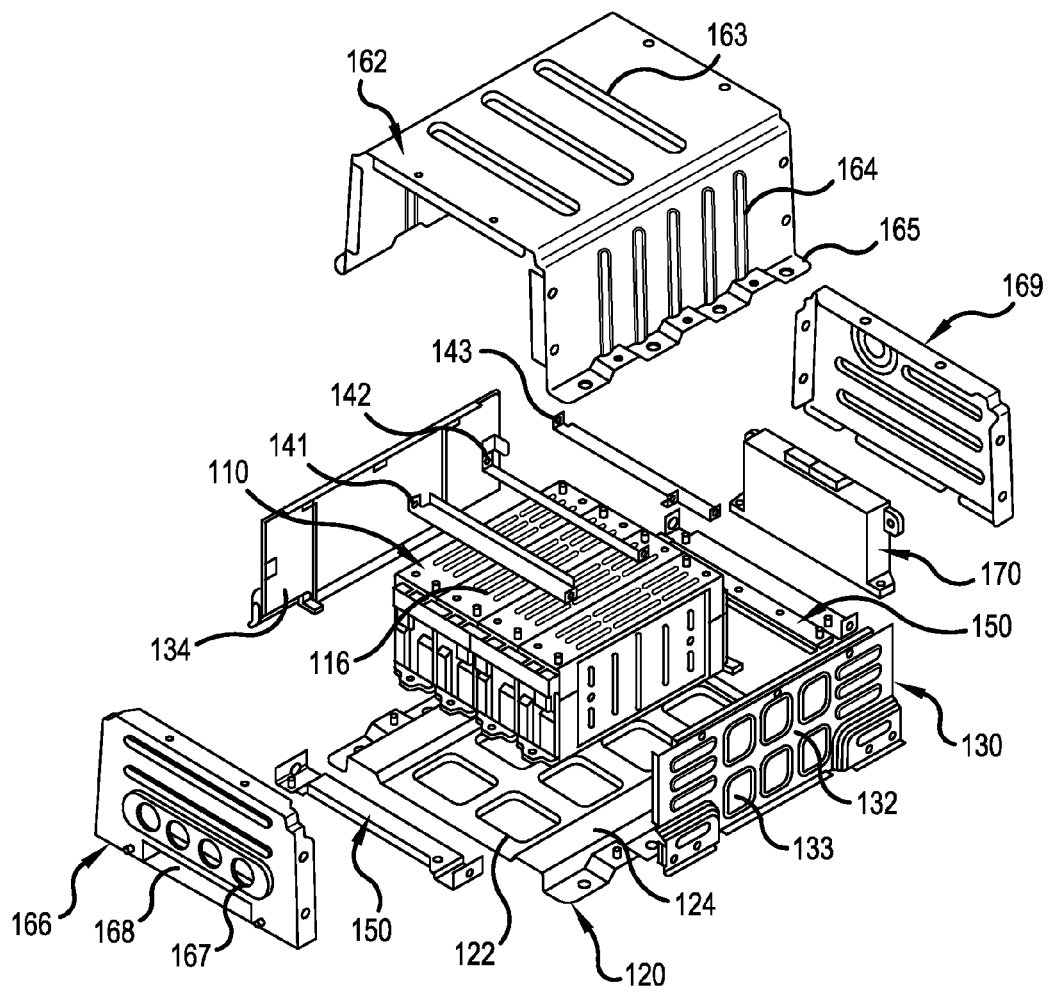
FIG. 2 is an exploded perspective view of the middle- or large-sized battery pack shown in FIG. 1.

FIG. 1 is a see-through view typically illustrating a middle- or large-sized battery pack according to a preferred embodiment of the present invention, and FIG. 2 is an exploded perspective view of the middle- or large-sized battery pack shown in FIG. 1.

Referring to these drawings, the middle- or large-sized battery pack 100 includes a module assembly 110 constituted by a plurality of unit modules, a base plate 120 on which the module assembly 110 is mounted, a pair of side support members 130, top connection members 141, 142, and 143, bottom support members 150, and a pack housing 160.

The module assembly 110 is constructed in a structure in which the respective unit modules are vertically located on the base plate 120. At the top of the module assembly 110 are formed a plurality of through-holes 116 for each battery module such that a coolant vertically passes through the module assembly 110 after the coolant is introduced into the module assembly 110 through the through-holes 116. The side support members 130 are disposed in tight contact with the corresponding sides of the module assembly 110 while the side support members 130 are coupled to the base plate 120.

The base plate 120 is provided with a plurality of beads 122, by which the base plate 120 exhibits high structural stability against an external force. Also, the base plate 120 is provided with a pair of rails 124, which continuously protrude upward to support opposite ends of the bottom support members 150.

Each side support member 130 includes a plate-shaped body 132 and an insulation member 134 attached to the inside of the plate-shaped body 132. Also, each side support member 130 is provided with a plurality of beads 133, by which each side support member 130 exhibits high durability or structural stability against an external force, such as twist, vibration, etc.

At the top of the stack of the battery modules, the three top connection members 141, 142, and 143 are coupled to the upper ends of the side support members 130 while the top connection members press the top of the module assembly 110.

Among the top connection members 141, 142, and 143, the top connection member 141, which is located near the front of the module assembly, has a height sufficient to come into tight contact with the pack housing 160 in the longitudinal direction thereof. Consequently, the top connection member 141 presses the front upper end of the module assembly 110 and, at the same time, is brought into tight contact with the inside top of the pack housing 160, with the result that a coolant, which is introduced into the rear upper end of the module assembly 110 from being discharged through the front of the module assembly, and the coolant is guided such that the coolant flows downward through the through-holes 116 formed at the respective battery modules.

The pack housing 160 includes a housing body 162 coupled to the base plate 120 while the housing body surrounds the top of the module assembly 110 and the side support members 130, a front plate 166 mounted to the front of the housing body 162, and a rear plate 169 mounted to the rear of the housing body 162.

The housing body 162 is provided at the top and opposite sides thereof with a plurality of depressed beads 163 and a plurality of protruding beads 164, respectively, by which the housing body 162 exhibits high durability or structural stability against an external force. The housing body 162 is fixed to the base plate by mechanical coupling using bolts and nuts.

Also, in order to achieve such mechanical coupling, the housing body 162 is provided at the side lower ends thereof with plate-shaped extensions 165. Corresponding plate-shaped extensions are also formed outside the rails 124 of the base plate 120.

The front plate 166 of the pack housing 160 is provided with four through-holes 167 for wiring cable connection. At the lower end of the front plate 166 is formed a coolant discharge hole 168 through which the coolant is discharged.

The coolant is introduced through a coolant inlet port formed at the rear upper end of the module assembly 110, flows downward through the respective battery modules while moving along the top of the module assembly 110, and is discharged through a coolant outlet port formed at the front lower end of the battery module 110.

Figure 3:
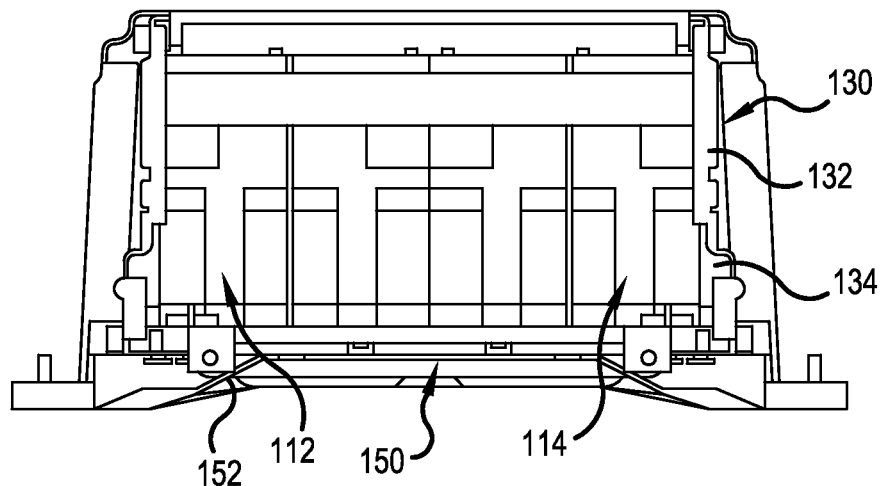
FIG. 3 is a front view typically illustrating the structure of the middle- or large-sized battery pack excluding a front plate of a pack housing from the middle- or large-sized battery pack.
Figure 4:
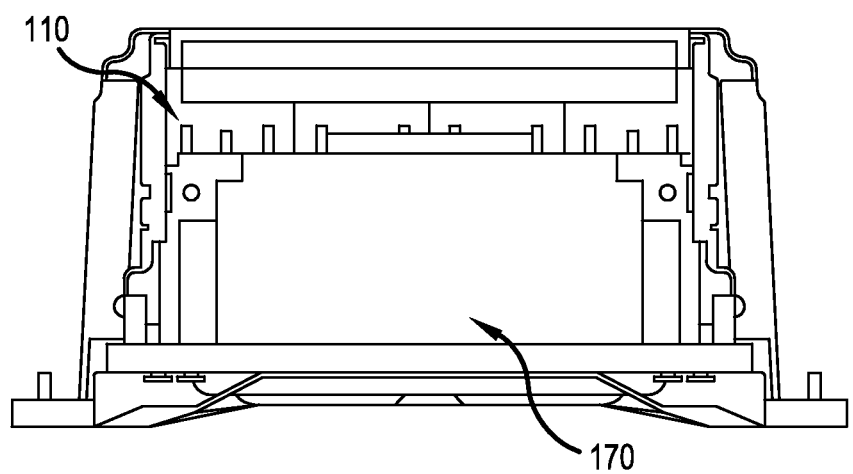
FIG. 4 is a rear view typically illustrating the structure of the middle- or large-sized battery pack excluding a rear plate of the pack housing from the middle- or large-sized battery pack.

FIG. 3 is a front view typically illustrating the structure of the middle- or large-sized battery pack excluding the front plate of the pack housing from the middle- or large-sized battery pack, and FIG. 4 is a rear view typically illustrating the structure of the middle- or large-sized battery pack excluding the rear plate of the pack housing from the middle- or large-sized battery pack.

Referring to these drawings, the side support members 130 are disposed in tight contact with the opposite sides of the module assembly 110, and the insulation members 134, which are made of a porous polymer material, are located between the plate-shaped bodies 132 of the side support members 130 and the outermost battery modules 112 and 114. Consequently, the insulation is achieved between the plate-shaped bodies 132 and the battery modules 112 and 114, and the leakage of the coolant between the outermost battery modules 112 and 114 and the side support members 130 is prevented.

Also, the opposite sides 152 of the bottom support members 150, which support the battery modules 112 and 114, are inclined to elastically support the battery modules. At the rear of the module assembly 110 is mounted a control member 170 for receiving and processing information, such as voltage, current, and temperature, from the respective battery modules. Consequently, it is possible to efficiently control the battery pack and greatly improve the safety of the battery pack.

Figure 5:
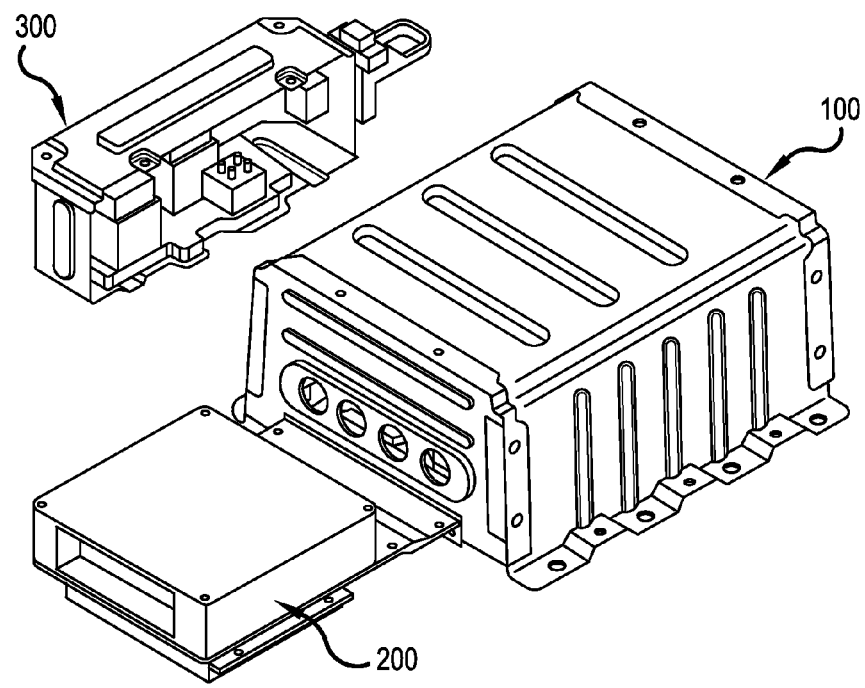
FIG. 5 is a typical view illustrating the structure of the middle- or large-sized battery pack to which a cooling fan and a service plug are mounted.

FIG. 5 is a typical view illustrating the structure of the middle- or large-sized battery pack to which a cooling fan and a service plug are mounted.

Referring to FIG. 5, the cooling fan 200 is mounted to the middle- or large-sized battery pack 100, at the coolant outlet port of the pack housing thereof, to achieve rapid and smooth flow of a coolant. Also, the service plug 300 is mounted to the battery pack 100 to intercept power as needed.

INDUSTRIAL APPLICABILITY

As apparent from the above description, the middle- or large-sized battery pack according to the present invention is simply assembled, has a compact and stable structure, and is constructed in a structure in which the front and the opposite sides of the module assembly are pressed by predetermined members to hermetically seal the module assembly, with the result that a coolant is effectively prevented from leaking from the front and the opposite sides of the module assembly, not the coolant flow channel. Consequently, the present invention has the effect of greatly improving the operational performance and safety of the battery pack through the cooling system of high cooling efficiency.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A middle- or large-sized battery pack comprising: a module assembly constructed in a structure in which a plurality of battery modules, each of which includes a plurality of battery cells or unit modules mounted in a module case while the battery cells or unit modules are connected in series to each other, are arranged such that the battery modules are disposed in contact with each other in the lateral direction, and a coolant flow channel is vertically formed; a plurality of support members for supporting opposite sides and the bottom and the top of the module assembly and maintaining the arrangement state of the module assembly; and a pack housing for surrounding the module assembly and the support members, wherein the support members include: a pair of side support members for preventing the coolant from leaking to the outside while surrounding sides of the outermost battery modules of the module assembly; a pair of bottom support members for supporting front and rear lower ends of the module assembly while spacing the module assembly from the bottom by a predetermined height, the bottom support members being coupled to the side support members; at least one top connection member connected to the side support members for guiding the coolant to the module assembly from the top of the module assembly, wherein the battery pack is constructed in a cooling structure in which a coolant is introduced through one side upper end (or lower end) of the module assembly along a hermetically sealed space defined by the support members, flows vertically through the module assembly, and is discharged through the other side lower end (or upper end) of the battery assembly, and wherein the pack housing includes a housing body coupled to the base plate while the housing body surrounds the top of the module assembly and the side support members, a front plate mounted to the front of the housing body, and a rear plate mounted to the rear of the housing body.

2. The middle- or large-sized battery pack according to claim 1, wherein the coolant is introduced through a rear upper end of the module assembly, flows downward vertically through the module assembly, and is discharged through a front lower end of the battery assembly.

3. The middle- or large-sized battery pack according to claim 1, wherein each of the side support members is generally constructed in a plate-shaped structure including a plate-shaped body and an insulation member mounted to the inside of the plate-shaped body where the plate-shaped body is disposed in contact with the module assembly for preventing the leakage of the coolant, securing the uniformity in temperature of the module assembly, and preventing the occurrence of a short circuit.

4. The middle- or large-sized battery pack according to claim 3, wherein the insulation member is made of a polymer material including closed pores.

5. The middle- or large-sized battery pack according to claim 1, wherein each of the bottom support members includes a frame body coupled to the front or rear lower end of the module assembly and side coupling parts formed at opposite ends of the frame body such that the side coupling parts are coupled to the side support members.

6. The middle- or large-sized battery pack according to claim 1, wherein the bottom support members are mounted on a base plate constructed in a structure in which a pair of rails continuously protrude upward to define the coolant flow channel while supporting the opposite ends of the bottom support members.

7. The middle- or large-sized battery pack according to claim 1, further comprising:
a control member mounted at the rear of the module assembly for receiving and processing at least one operational information selected from a group consisting of voltage, current, and temperature from the respective battery modules.

8. The middle- or large-sized battery pack according to claim 1, wherein at least two or more top connection support members connected to the side support members, and among the top connection members, the top connection support member located near the front of the module assembly has a height sufficient to come into tight contact with the pack housing in the longitudinal direction thereof.

9. The middle- or large-sized battery pack according to claim 1, wherein the housing body is provided at the top and opposite sides thereof with a plurality of beads for improving the structural stability of the housing body against an external force, and the beads formed at the top of the housing body are constructed in a depressed structure while the beads formed at the opposite sides of the housing body are constructed in a protruding structure.

10. The middle- or large-sized battery pack according to claim 1, wherein the front plate is provided with one or more through-holes for wiring cable connection, and the rear plate is provided with one or more coolant inlet ports for coolant introduction.

11. The middle- or large-sized battery pack according to claim 1, wherein each of the battery cells is a pouch-shaped battery cell constructed in a structure in which an electrode assembly is mounted in a battery case made of a laminate sheet including a metal layer and a resin layer.

12. The middle- or large-sized battery pack according to claim 1, wherein each of the unit modules includes two or more battery cells constructed in a structure in which electrode terminals are connected in series to each other, and connections between the electrode terminals are bent such that the battery cells are stacked, and a pair of high-strength module cases coupled to each other to surround the battery cells excluding the electrode terminal regions.

13. The middle- or large-sized battery pack according to claim 1, further comprising:
a cooling fan mounted at the front of the pack housing such that the cooling fan communicates with a coolant outlet port formed at the pack housing.

14. The middle- or large-sized battery pack according to claim 1, wherein the battery pack is used as a power source for electric vehicles or hybrid electric vehicles.

\* \* \* \* \*